(12) United States Patent
Dolph

(10) Patent No.: US 8,270,818 B2
(45) Date of Patent: Sep. 18, 2012

(54) DIGITAL VIDEO RECORDING SYSTEM WITH EXTENDED PROGRAM CONTENT RECORDING

(75) Inventor: Blaine H. Dolph, Western Springs, IL (US)

(73) Assignee: International Business Machines Corporation, Armonk, NY (US)

(*) Notice: Subject to any disclaimer, the term of this patent is extended or adjusted under 35 U.S.C. 154(b) by 1153 days.

(21) Appl. No.: 12/126,629

(22) Filed: May 23, 2008

(65) Prior Publication Data

US 2008/0260349 A1     Oct. 23, 2008

Related U.S. Application Data

(63) Continuation of application No. 11/422,677, filed on Jun. 7, 2006, now abandoned.

(51) Int. Cl.
*H04N 5/76* (2006.01)
(52) U.S. Cl. ......................... 386/296; 386/298
(58) Field of Classification Search .................. None
See application file for complete search history.

(56) References Cited

U.S. PATENT DOCUMENTS

| | | | | |
|---|---|---|---|---|
| 6,311,011 B1 * | 10/2001 | Kuroda | .......................... | 386/297 |
| 7,260,312 B2 * | 8/2007 | Srinivasan et al. | ............ | 386/248 |
| 2003/0118321 A1 | 6/2003 | Sparrell et al. | | |
| 2003/0156342 A1 | 8/2003 | Yap et al. | | |
| 2004/0078829 A1 | 4/2004 | Patel et al. | | |
| 2005/0166258 A1 | 7/2005 | Vasilevsky et al. | | |
| 2005/0262534 A1 | 11/2005 | Bontempi et al. | | |
| 2009/0257733 A1 * | 10/2009 | Ellis | ................................ | 386/83 |

* cited by examiner

*Primary Examiner* — Huy T Nguyen
(74) *Attorney, Agent, or Firm* — Jason H. Sosa; Mark C. Vallone; Schubert Osterrieder & Nickelson PLLC (57) ABSTRACT

Systems, methods and media for managing extended program content for a digital video recorder (DVR) are disclosed. Embodiments of a method may include determining an amount of extended program content to record in addition to the program to be recorded, where the extended program content is associated with the program to be recorded. The extended content may include either or both of program pre-content or program post-content. The method may also include recording the determined amount of extended program content and the program to be recorded. In a further embodiment, the method may include receiving an indication that the user desires to view extended program content and playing at least part of the extended program content. Determining the amount of extended program content to record may be based on one or more of available storage space, a specified time, a specified file size, user preferences, or other factors.

20 Claims, 5 Drawing Sheets

DIGITAL VIDEO RECORDING SYSTEM WITH EXTENDED PROGRAM CONTENT RECORDING

CROSS-REFERENCES TO RELATED APPLICATIONS

Pursuant to 35 USC §120, this continuation application claims priority to and benefit of U.S. patent application Ser. No. 11/422,677, entitled "DIGITAL VIDEO RECORDING SYSTEM WITH EXTENDED PROGRAM CONTENT RECORDING", filed on Jun. 7, 2006, the disclosure of which is incorporated herein in its entirety for all purposes.

FIELD OF INVENTION

The present invention is in the field of digital recording and playback systems and methods and, in particular, to systems, methods and media for managing extended content for digital programs by a digital video recording device, such as a digital video recorder (DVR).

BACKGROUND

Digital video recording and playback systems, including digital video recorders (DVRs), continue to become more and more ubiquitous as prices decline, technological features advance, and digital distribution of content proliferates. Using DVRs or other recording and playback systems, users may record broadcast programs for later viewing. To record a program, a user may typically interact with the DVR to instruct it to record the program, such as by interaction with a programming guide with a list of available programs. In some situations, users may also select a channel and start and ending times for the recording. The DVR may then record the program from its scheduled start time until its scheduled end time while also storing the recorded program. At a later time, the user may then view the recorded and stored program at their leisure.

One problem with recording broadcast programming is that broadcasts often extend over their scheduled times, making it possible for a viewer to miss some of the broadcast content when viewing the recorded program. A program may begin early, for example, if the program preceding it ends earlier than anticipated, clock differentials between the DVR and content provider, scheduling changes, or other reasons. Similarly, a user may miss content after the scheduled end time because of scheduling changes, clock differentials, or more commonly programs that run long because of interruptions (e.g., preemption by presidential address, weather alert, or breaking news) or unanticipated delays (e.g., a football game going to overtime). If a user has requested their DVR to record from a start time to an end time, the user may thus miss potentially valuable and interesting content, such as the end of a game or drama or the introduction to a program.

One solution to this problem is for the user to manually go into the planned recorded program and instruct the DVR to record additional time over the scheduled program. This solution, however, requires manual modification and thus is labor-intensive as the user would need to perform the modification for each program for which they desire to record additional time. As a user may not know which program is likely to start early or overrun, much of the effort in modifying start or end times will be wasted. Moreover, even if the user knew precisely which programs were likely to need additional recording time (such as if the user wanted to record extra time on sporting events in case of overtimes), such a solution would require manual intervention by the user for each program and would thus be inefficient. There is, therefore, a need for an efficient and effective system to record and manage extended program content for recorded programs on a DVR or other digital recorder.

SUMMARY OF THE INVENTION

The problems identified above are in large part addressed by systems, methods and media for managing extended digital program content. Embodiments may include a method for managing extended digital content that includes receiving by a digital video recorder (DVR) a request from a user to record a program. The method may also include determining by the DVR an amount of extended program content to record in addition to the program to be recorded, where the extended program content is associated with the program to be recorded. The method may also include recording by the DVR the determined amount of extended program content and the program to be recorded. The extended content may include either or both of program pre-content or program post-content. In a further embodiment, the method may include receiving by the DVR an indication that the user desires to view extended program content and playing by the DVR at least part of the extended program content. In some embodiments, determining the amount of extended program content to record may be based on one or more of available storage space, a specified time, a specified file size, program length, program type, user preferences, content provider preferences, or digital video recorder provider preferences.

Another embodiment provides a machine-accessible medium containing instructions effective, when executing in a data processing system, to cause the system to perform a series of operations for managing extended digital program content for a DVR. The series of operations generally includes receiving a request from a user to record a program and determining an amount of extended program content to record in addition to the program to be recorded, where the extended program content is associated with the program to be recorded. The series of operations may also include recording the determined amount of extended program content and the program to be recorded. In a further embodiment, the series of operations may include receiving an indication that the user desires to view extended program content and playing at least part of the extended program content.

A further embodiment provides a digital video recording system having a digital video recorder (DVR) in communication with a network to receive program content. The DVR may include a user interface module to receive inputs from a user and a program guide service in communication with the user interface module to provide a list of programs to the user and to receive requests to record a program from the user. The DVR may also include a content manager with a content recording/playback module to record a program in response to a request to record the program from the user. Embodiments of the DVR may also include an extended program content module to determine an amount of extended program content associated with the recorded program to record and to record the determined extended program content. Embodiments of the digital video recording system may also include digital video recorder storage in communication with the DVR for storage of recorded programs and recorded extended program content. In some embodiments, the extended program content module may determine and record the extended program content automatically.

BRIEF DESCRIPTION OF THE DRAWINGS

Aspects of the invention will become apparent upon reading the following detailed description and upon reference to the accompanying drawings in which, like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for managing extended program content for a digital video recorder (DVR) are disclosed. Embodiments of a method may include determining an amount of extended program content to record in addition to the program to be recorded, where the extended program content is associated with the program to be recorded. The extended content may include either or both of program pre-content or program post-content. The method may also include recording the determined amount of extended program content and the program to be recorded. In a further embodiment, the method may include receiving an indication that the user desires to view extended program content and playing at least part of the extended program content. Determining the amount of extended program content to record may be based on one or more of available storage space, a specified time, a specified file size, user preferences, or other factors.

The system and methodology of the disclosed embodiments may provide for recording, playback, and management of extended program content associated with a recorded program on a DVR. In some embodiments, the system may record extended program content automatically, eliminating the need for a user to actively choose to record the content or to remember to do so. When a user begins to watch a recorded program, the system may give them the opportunity to view recorded pre-content first or, in other cases, the user may decide to watch program pre-content after beginning to watch the recorded program and realizing that the recording did not capture the beginning of the program. Similarly, when viewing of a recorded program is complete, the disclosed system may present the user with an opportunity to view any recorded program post-content, which may be particularly desirable when the recorded program missed the end of the show. As will be described in more detail subsequently, the disclosed system and methodology may accordingly provide an efficient and effective mechanism for a user of a DVR to manage extended program content associated with recorded programs.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable storage medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable storage medium providing program code for use by or in connection with a computer or any instruction execution system. For the purposes of this description, a computer-usable or computer readable storage medium can be any apparatus that can, store the program for use by or in connection with the instruction execution system, apparatus, or device. The storage medium may be an electronic, magnetic, optical, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks, including wireless networks. Modems, cable modems and Ethernet cards are just a few of the currently available types of network adapters.

Figure 1:
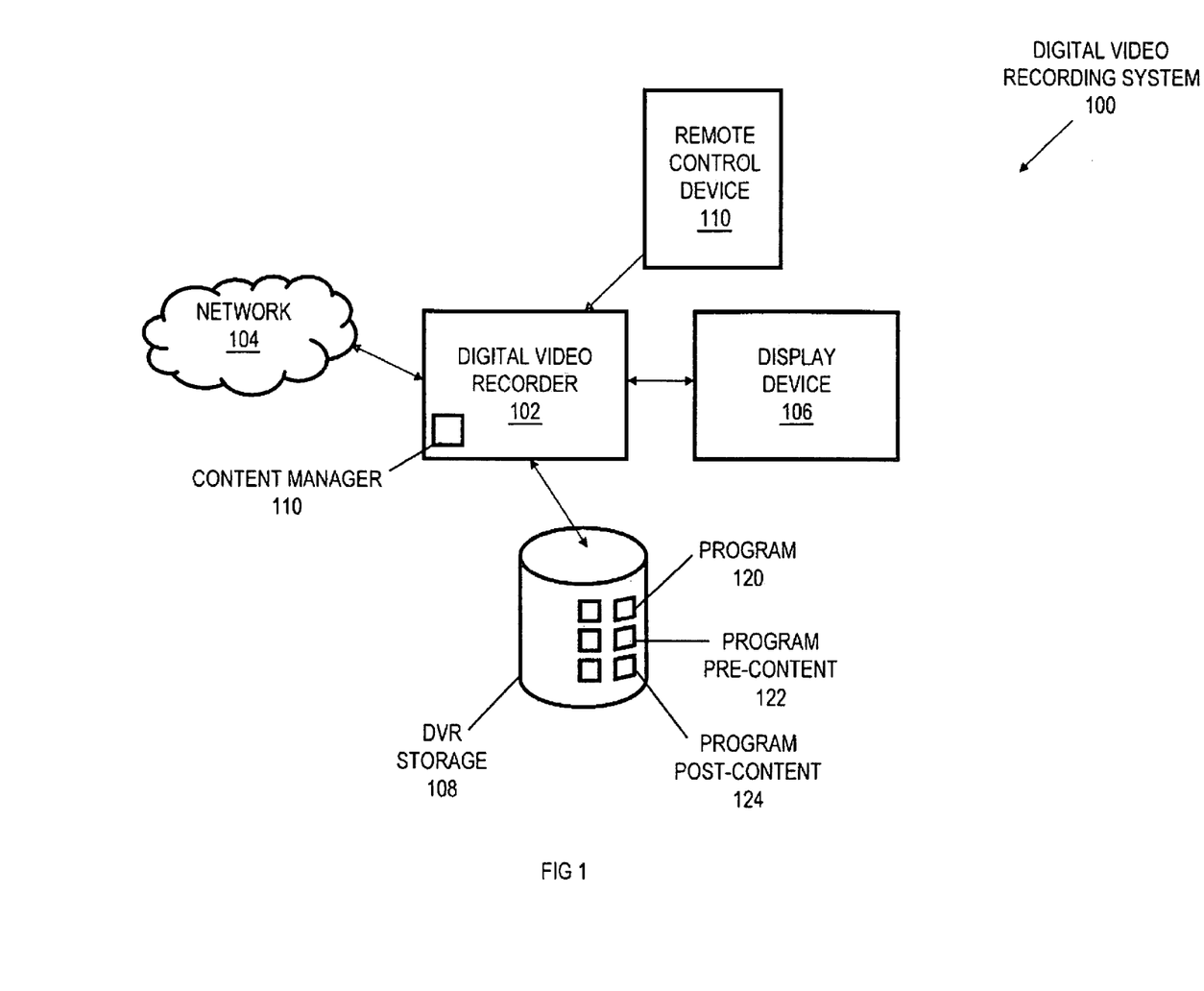
FIG. 1 depicts an environment for a digital video recording system with a digital video recorder according to one embodiment.

Turning now to the drawings, FIG. 1 depicts an environment for a digital video recording system with a digital video recorder according to one embodiment. In the depicted embodiment, the digital video recording system 100 includes a digital video recorder (DVR) 102 in communication with a network 104 to provide digital or analog broadcast content to the DVR 102. The DVR 102 may be in communication with a display device 106 so that recorded content of the DVR may be displayed to a user via display device 106. DVR 102 may also be in communication with DVR storage 108 for storage of recorded content. DVR storage 108 may be integrated into the DVR 102 or may be a separate component. A user may interact with the DVR 102 in some embodiments with a remote control device 110 for wireless transmissions to the DVR 102.

As will be described in more detail subsequently, the DVR 102 (via a content manager 110) may record extended content before and/or after a program and store the extended content on the DVR storage 108 in separate files from the program content. The user may select to view the extended content (such as in response to a query from the DVR 102) so that they may watch 'missed' content if the recorded program was not completely recorded. After viewing a recorded game, for example, the DVR 102 could offer the user the option of viewing extended content recorded after the schedule end of the scheduled game, providing the user with the ability to watch the extended content if the game lasted longer than schedule because of interruptions, overtime, or other reasons. If the user chooses to ignore either program post-content or pre-content, the associated files containing the extended content may be deleted to free storage space. The disclosed digital video recording system 100 may thus effectively and efficiently manage extended content for broadcast programs by recording, playing, and deleting files associated with the extended content.

The DVR 102 may be any digital recording device (also known as a personal video recorder, or PVR, or a personal digital video recorder) that is adapted to record and store content received from a network 104 to digital storage. Content may typically include television shows (including video and audio) broadcast via analog means (and received via an antenna) or digital means, such as from a cable or satellite provider or a broadband network. The DVR 102 may optionally be incorporated into a set-top box for receiving content, such as those provided by cable or satellite providers. In another alternative embodiment, the DVR 102 may be incorporated into a personal computer or other general purpose data processing system. Network 104 may include communications (i.e., delivery of program content) via cable, satellite broadcast, analog television broadcast, computer network (e.g., wide area network, or WAN, or the Internet, fixed terrestrial wireless network, or other communication means) and may also include components for receiving, demodulating, or decrypting content such as antennas, tuners, demodulators, etc. The DVR 102 may also have a program guide service that receives program information and generates an electronic program guide (EPG) that facilitates selection of programs to record by the user. The DVR 102 may receive programming information for the EPG via a network 104, including broadband networks, WANs, cable modem, telephone modems, satellite networks, fixed terrestrial wireless network, or other networks.

Display device 106 may typically be a television set (including high definition television, or HDTV, sets) or may also include a computer monitor, handheld viewing device, laptop screen, or other display device. Display device 106 may be either an analog or digital output device capable of handling output from the DVR 102. Optional remote control device 110 may facilitate interaction between a user and the DVR 102 via wireless transmission of commands to the DVR 102 by a transmitter. In some embodiments, the remote control device 110 may also have a receiver in addition to a transmitter to receive information from the DVR 102 for display to the user, such as information about particular programs or upcoming events, advertising, or other information.

DVR storage 108 may be either integrated into DVR 102 or may be separate storage connected to the DVR 102 via wired or wireless connection. DVR storage 108 may be any type of storage, including one or more of hard disk drives, semiconductor or solid state memory, RAM, writeable optical drives, removable memory (such as CF or SD cards), or any other type of storage. DVR storage 108 may include a plurality of files each containing recorded content and each file may be in a suitable format, such as files in conformance with the Motion Picture Experts Group (MPEG) or other standard. Files stored on DVR storage 108 may include one or more programs 120, program pre-content 122, and program post-content 124. As will be described in more detail, program pre-content 122 and program post-content 124 may contain recorded extended program content that is associated with a program 120 (i.e., content broadcast immediately preceding and subsequent, respectively, the scheduled program 120). A user may request from a DVR 102 playback of recorded program pre-content 122 or program post-content files 124 for a particular program 120 if they desire to view the content before or after a scheduled, recorded program 120.

The systems and methodologies of the disclosed embodiments accordingly may provide an efficient and effective mechanism to manage extended program content for a DVR. The disclosed system may record additional, extended program content before and/or after a scheduled recording of a program. In some embodiments, the recording may occur automatically and without necessity of user intervention. When a user later views a recorded program, they may be offered an opportunity to view the recorded extended program content, which may be particularly useful when a recorded program does not contain all of the desired content (e.g., the recorded program overran the scheduled end time). The user may choose to view the extended program content, to ignore the extended program content, to delete the extended program content from storage, or otherwise manage the extended program content.

Figure 2:
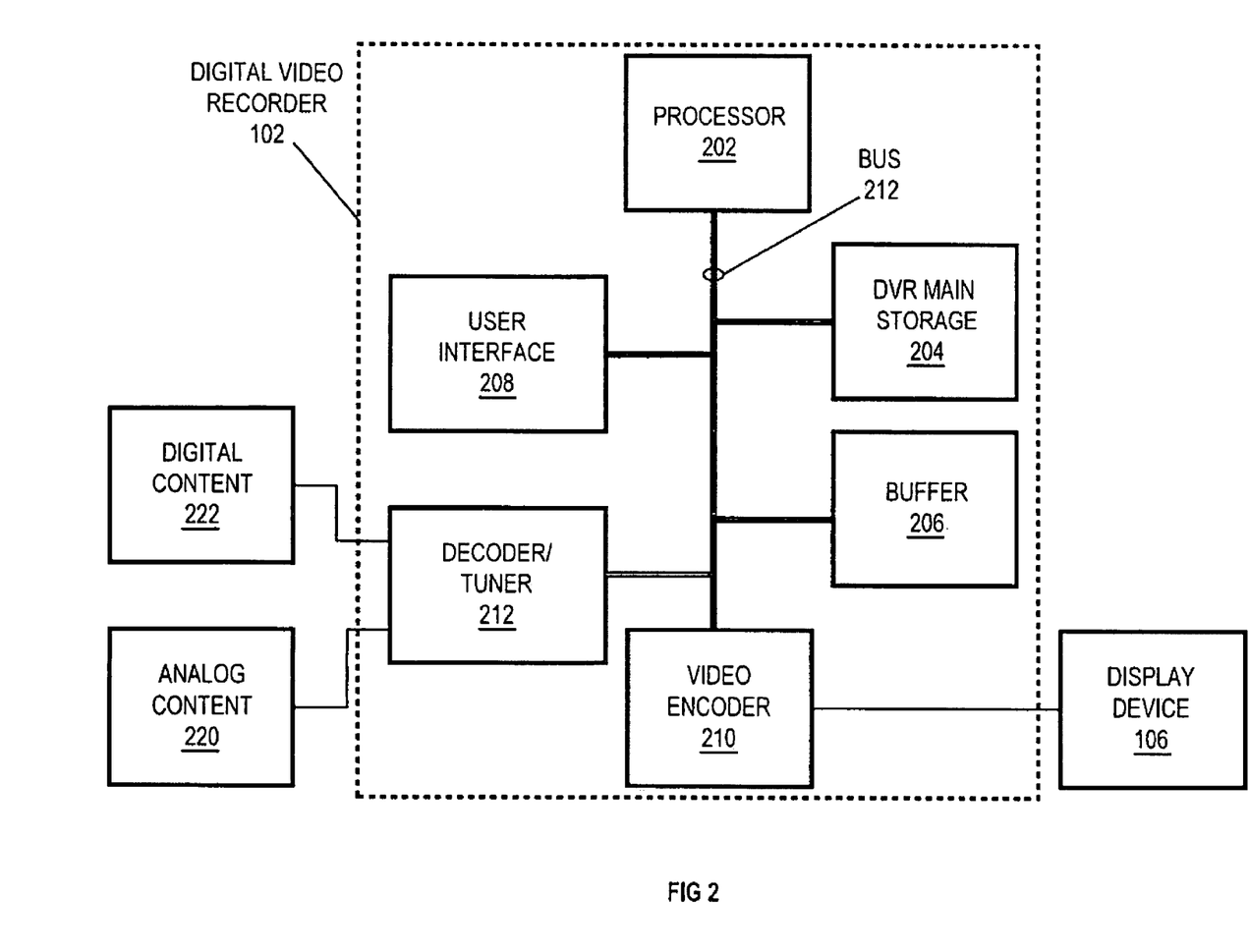
FIG. 2 depicts a block diagram of one embodiment of a digital video recorder suitable for use as a component of the digital video recording system.

FIG. 2 depicts a block diagram of one embodiment of a digital video recorder 102 suitable for use as a component of the digital video recording system 100. The digital video recorder 102 of FIG. 2 is an exemplary embodiment, and one of ordinary skill in the art will recognize other DVR designs may also be suitable, including those designs having capabilities other than those ascribed herein and possibly beyond those capabilities. In the depicted embodiment, the DVR 102 includes a processor 202, DVR main storage 204, buffer 206, a user interface 208, a video encoder 210, and one or more decoder/tuners 212 connected to a bus 212. The bus 212 facilitates communication between the processor 202 and other components of the DVR 102, as well as communication between components.

Processor 262 may include one or more system central processing units (CPUs) or processors to execute instructions, such as an IBM® PowerPC™ processor, an Intel Pentium® processor, an Advanced Micro Devices Inc. processor or any other suitable processor. Processor 202 may execute instructions, for example, to perform graphical user interface functions for elements of the flowcharts of FIGS. 4 and 5. The processor 202 may store information in either DVR main storage 204 or buffer 206. DVR main storage 204 may be one or more mass storage devices, which may be non-volatile storage such as one or more hard drives, tape drives, diskette drives, CD-ROM drive, DVD-ROM drive, or the like. Processor 202 may typically store files such as recorded programs 120, program pre-content 122, or program post-content 124 on DVR main storage 204. Buffer 206, which may include volatile memory such as RAM or double data rate (DDR) synchronous dynamic random access memory (SDRAM), may be used by processor 202 for shorter-term storage, such as for virtual frames for a graphical user interface. DVR storage 108 of FIG. 1 may include DVR main storage 204 and/or buffer 206.

User interface 208 may provide for receiving input from a user as well as optionally providing output to a user. User interface 208 may include, for example, a receiver for receiving commands from a user via a remote control device 110. User interface 208 may also optionally include a transmitter to send information to the remote control device 110. User interface 208 may also include user input devices such as buttons, switches, etc. positioned on the DVR 102 so that users may enter commands without use of a remote control device 110. A user may actuate user input devices to request playing, recording, deletion of files, etc. For DVRs 102 included as part of a computer system, user input devices may include pointing devices, keyboards, etc.

The video encoder 210 may receive content to be displayed (including recorded content and graphical user interface content), optionally encode or transform the content, blend content as necessary (such as graphical user interface and recorded content shown simultaneously), and transmit it to a display device 106 for display to the user. In some embodiments, the video encoder 210 may include an NTSC (National Television Standards Committee) encoder that encodes the content into a coded analog signal for display. In alternative embodiments, the video encoder 210 may include other types of encoders, such as PAL (Phase Alternating Line) or SECAM (Sequential Color with Memory) encoders. In other embodiments, video encoder 210 may process content for digital display, such as for processing video for display on a HDTV. The video encoder 210 may encode or otherwise process both video and sound (e.g., digital-to-analog sound converter, or DAC).

Decoder/tuner 212 may include one or more tuning and demodulating units that tune the system to a program channel of interest (under the direction of the user and processor 202) and demodulate the signal in a manner known in the art. The decoder/tuner 212 may receive and process digital content 222 (such as via satellite or digital cable) and/or analog content 220 (such as NTSC television signals). A DVR 102 may have multiple decoder/tuners 212 so that multiple streams of programming content (whether digital or analog) may be recorded simultaneously.

Figure 3:
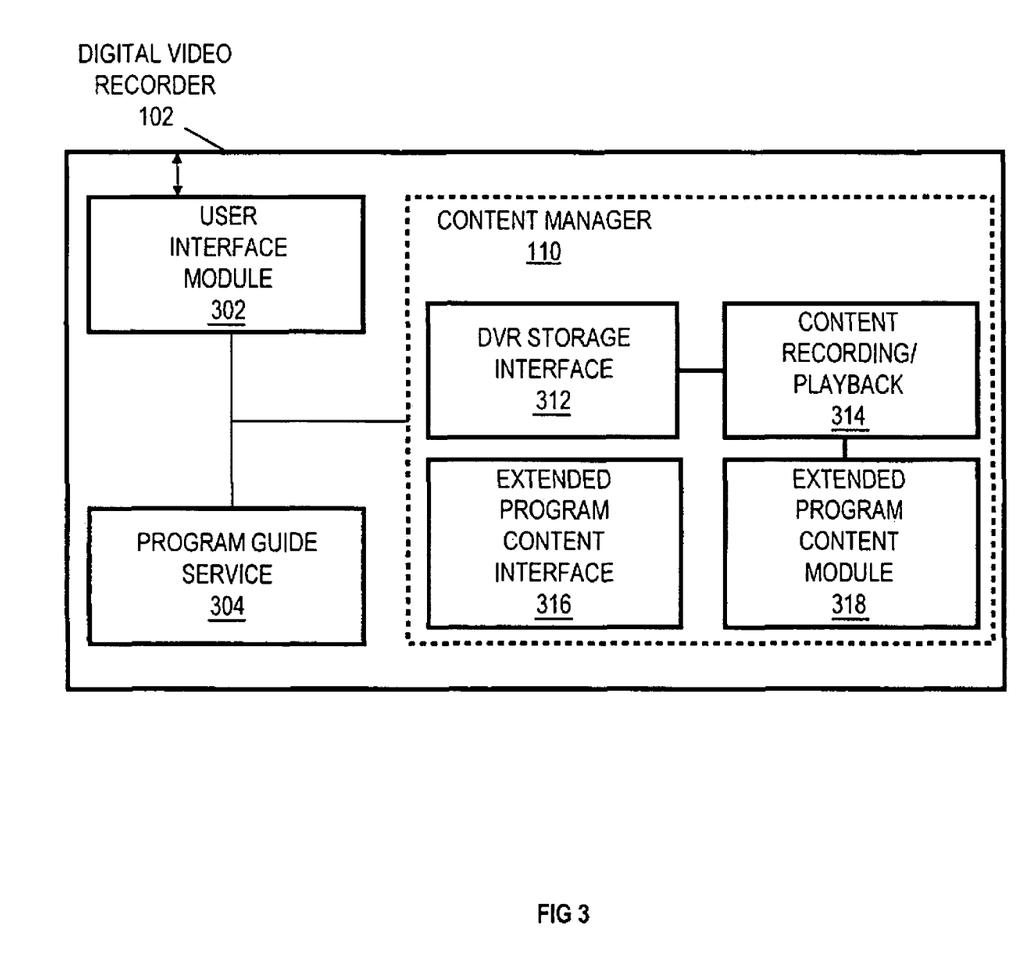
FIG. 3 depicts a conceptual illustration of software components of a DVR of the digital video recording system, including a content manager, according to one embodiment.

FIG. 3 depicts a conceptual illustration of software components of a DVR 102 of the digital video recording system 100, including a content manager, according to one embodiment. One or more of the software components of the DVR 102, including the content manager 110, may execute on a processor 202. As described previously (and in more detail in relation to FIGS. 4 and 5), the DVR 102 may facilitate management and storage of programs and extended content. The DVR 102 may include a user interface module 302 and a program guide service module 304 in addition to the content manager 110. The user interface module 302 may (in conjunction with user interface 208) may receive inputs from the user (such as commands or requests) and may generate output for the user (such as a graphical user interface). The program guide service 304 may construct an electronic program guide (EPG) to present details about programs to users in the form of a graphical user interface. The program guide service 304 may receive information from a content provider. For example, a DVR 102 receiving digital content 222 from a digital cable provider may also receive program guide service information via a cable connection, a telephone/modem, a broadband connection, or other connection. The program guide service 304 may also, in conjunction with the user interface module 302, may provide a list of programs to the user (which the user may navigate using the remote control device 110 or other input device) and may receive requests to record one or more programs from the user.

The content manager 110 may include a DVR storage interface 312, a content recording/playback module 314, an extended content interface 316, and an extended content recording/playback module 318. The DVR storage interface 312 may facilitate communications between the DVR 102 and the DVR storage 108, including storage of recorded content in the DVR storage 108 and access of that content for playback. The content recording/playback module 314 may record a program in response to a request to record the program from the user (via user interface module 302 and/or program guide service 304). The content recording/playback module 314 may also playback a program in response to request from the user by accessing the recorded program in DVR storage 108 and providing for display of the recorded content on display device 106. The content recording/playback module 314, as with other components of the content manager 110, may interact with the user in conjunction with user interface module 302.

The extended content interface 316 may, in conjunction with the user interface module 302, receive requests from a user to record and/or playback extended program content associated with a program being recorded by the content recording/playback module 314, including satisfying user preferences as to the amount of extended program content to record, whether or not to delete the extended program content, or other requests. The extended program content module 318 may determine an amount of extended program content associated with a recorded program to record and may then record the determined extended program content. The extended program content module 318 may determine to record extended program content automatically, in response to a user request for a particular program, or based on other methodology. The extended program content module 318 may determine the amount of extended program content to record based on one or more of available storage space, a specified time, a specified file size, program length, program type, user preferences, content provider preferences, or digital video recorder provider preferences. The extended program content module 318 and extended program content interface 316 may be stand-alone modules or may be integrated with other components, such as the content recording/playback module 314.

Figure 4:
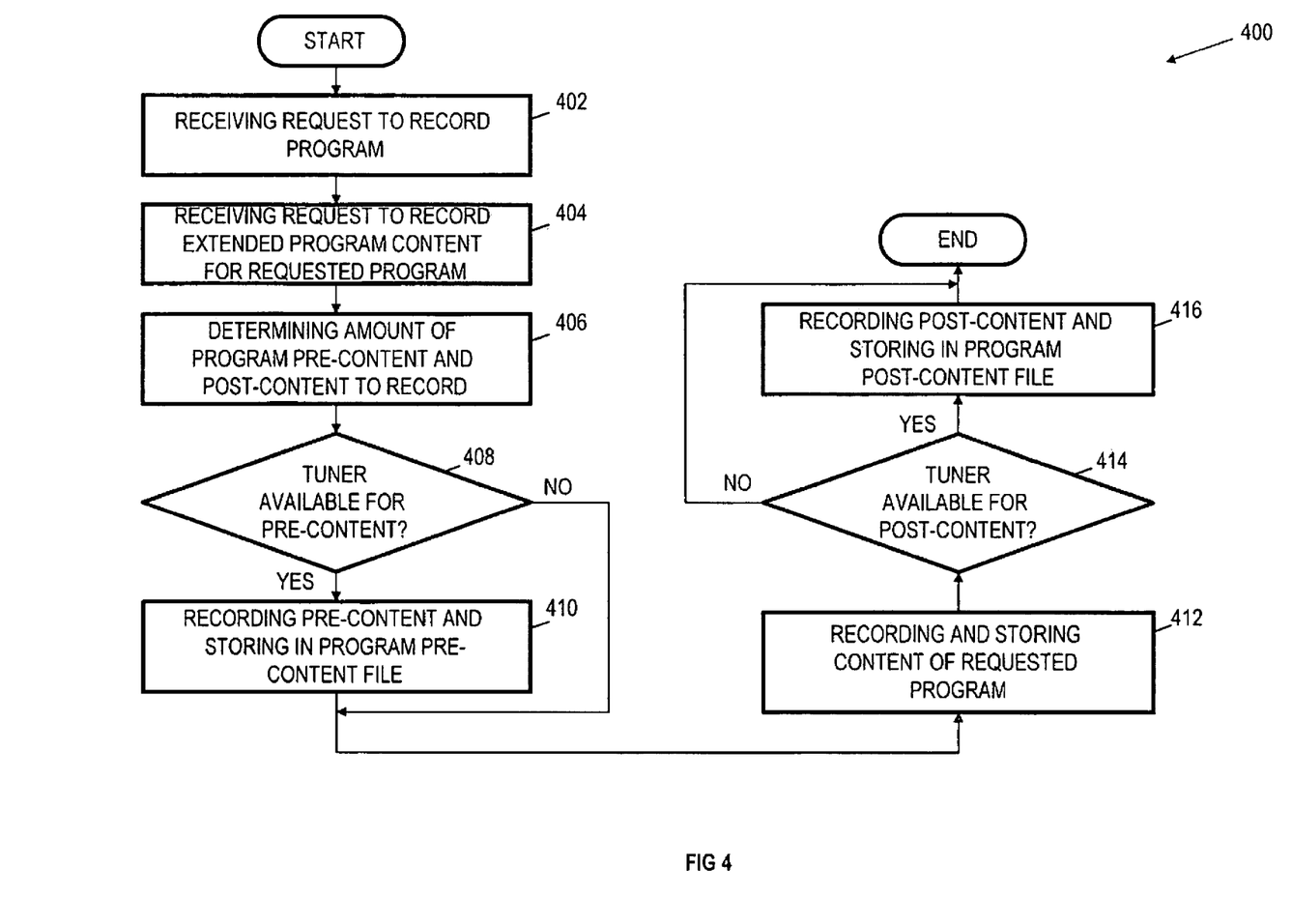
FIG. 4 depicts an example of a flow chart for recording extended program content according to one embodiment.

FIG. 4 depicts an example of a flow chart 400 for recording extended program content according to one embodiment. The method of flow chart 400 may be performed, in one embodiment, by components of a DVR 102 such as a content manager 110. Flow chart 400 begins with element 402, where the user interface module 302 may receive a request to record a program, such as by a user selection of a particular program using the program guide service 304. The request to record a program may include a reference to a particular program, a reference to start time and/or end time, or other means.

The content manager 110 may determine at elements 404 and 406 whether to record extended program content for the program to be recorded as well as the terms of the recording. At element 404, the extended program content interface 316 (via user interface module 302) may optionally receive a request to record extended program content for the program requested at element 402. The request to record extended program content may optionally include additional user preference information such as whether to record either or both of program pre-content and program post-content, how much extended program content to record, etc. In other embodiments, element 404 is not executed and extended program content may be recorded automatically or via other methodology. At element 406, the extended program content module 318 may, based on the specifics of the request at element 404, if any, determine the amount of program pre-content and post-content to record.

To determine the amount of program pre-content and post-content to record, the extended program content module 318 may base its determination on one or more of available storage space, a specified time, a specified file size, program length, program type, user preferences, content provider preferences, or digital video recorder provider preferences. If the user specifies that only program post-content should be recorded, for example, the extended program content module 318 may determine only to record program post-content and not pre-content. In another example, the extended program content module 318 may determine to record extended program content for a particular type of program, such as by determining that all sports programming should have fifteen minutes of recorded program post-content to account for overtimes or other delays. In another example, the extended program content module 318 may determine how much extended program content to record based on available disk space for buffer overflow, such as by a specified percent, number of megabytes, or other variable. One of ordinary skill in the art will recognize that other types of determination methodologies may be used to determine whether and how much extended program content to record.

Once the time to record a program is nearing, the extended program content module 318 (in situations where it has determined to record program pre-content) may optionally determine at decision block 408 whether a decoder/tuner 212 is available for processing the program pre-content. If no decoder/tuner 212 is available (such as if other programs are being recorded at that time that are utilizing all available decoder/tuners 212), the method of flow chart 400 may continue to element 412. If a decoder/tuner 212 is available, the extended program content module 318 may, at element 408, record the program pre-content and store it in a program pre-content file 122. At element 412, the content recording/playback module 314 may record the content of the requested program and store it in a program file 120.

After recording the requested program, the extended program content module 318 may determine at decision block 414 whether program post-content will be recorded and whether a decoder/tuner 212 is available for processing the program post-content. If no decoder/tuner 212 is available, the method of flow chart 400 terminates. If a decoder/tuner 212 is available, the extended program content module 318 may record program post-content and store the post-content in a program post-content file 124, after which the method terminates. At the termination of flow chart 400, the DVR storage may thus include the recorded program 120 as well as associated program pre-content 122 and program post-content files 124.

Figure 5:
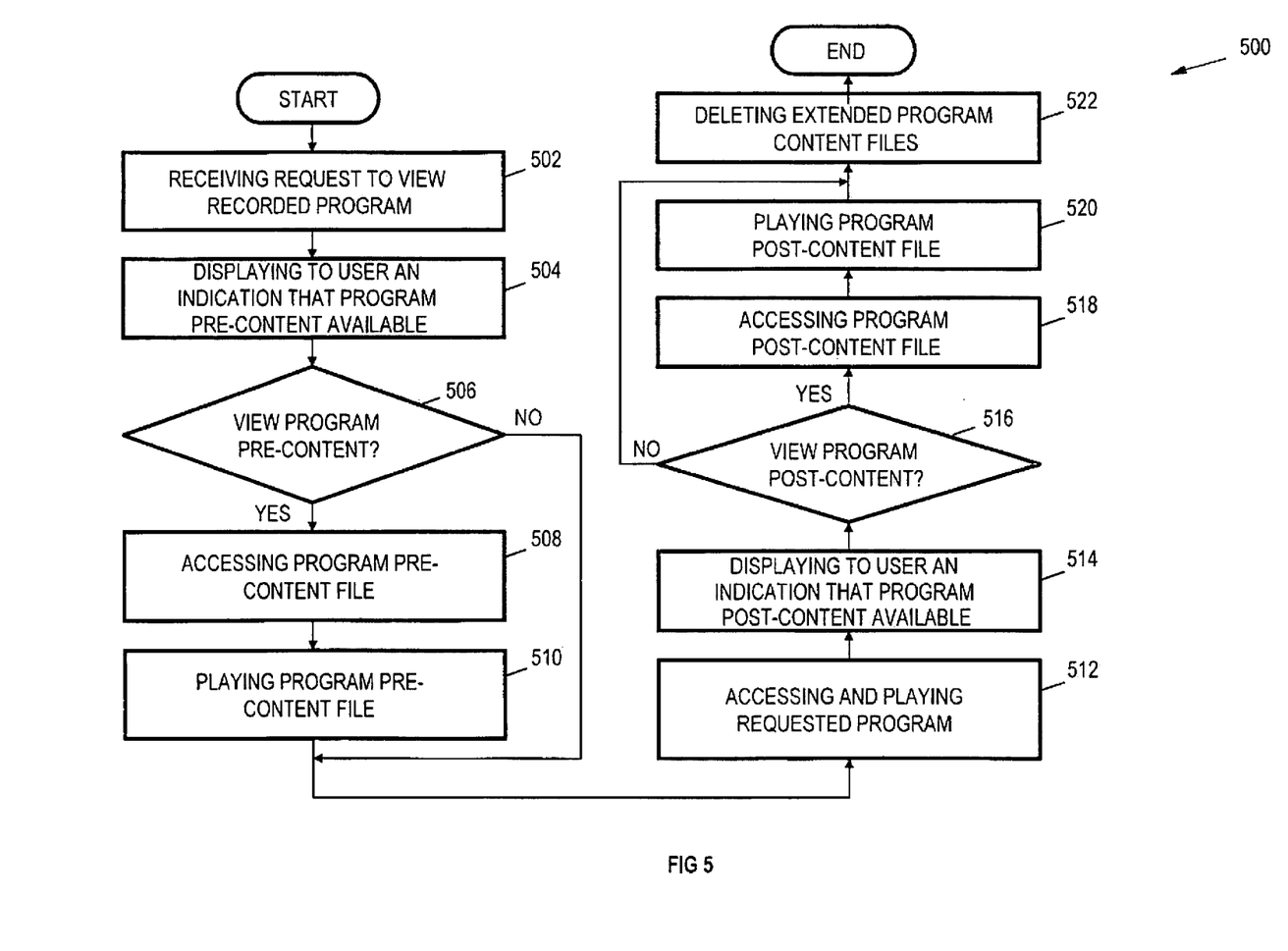
FIG. 5 depicts an example of a flow chart for playing back extended program content according to one embodiment.

FIG. 5 depicts an example of a flow chart 500 for playing back extended program content according to one embodiment. The method of flow chart 500 may be performed, in one embodiment, by components of a DVR 102 such as a content manager 110. Flow chart 500 begins with element 502, where the user interface module 302 may receive a request to playback a recorded program, such as by a user selection of the program using a graphical user interface. If a program pre-content file 122 exists for the recorded program, the extended program content interface 316 (via user interface module 302) may at element 504 display to the user an indication that program pre-content is available. At decision block 506, the extended program content module 318 may determine if the user desires to view program pre-content, such as by receiving, an indication that the user desires to view the program pre-content or based on user preferences or defaults.

If the user indicates a desire to watch the program pre-content, the extended program content module 318 may at element 508 access the program pre-content file 122 and playback the program pre-content at element 510, allowing the user to view the program pre-content. In some embodiments, playback of the program pre-content file may be controlled similarly to recorded programs, allowing the user to pause, stop, fast forward, rewind, etc. If the user does not desire to watch the program pre-content (or if it was not recorded), the method of flow chart continues directly to element 512.

At element 512, the content recording/playback module 314 may access and playback the requested program to the user. Once playback is complete, the extended program content interface 316 may at element 514 (via user interface module 302) display to the user an indication that program post-content is available. At decision block 516, the extended program content module 318 may determine if the user desires to view program post-content, such as by receiving an indication that the user desires to view the program post-content or based on user preferences or defaults. A user, for example, may reach the end of the record program and realize that the end of the program has been truncated. The user may thus recapture the 'lost' content after the program recording stopped, preventing the user from missing part of their desired program in some cases. If the user indicates a desire to watch the program post-content, the extended program content module 318 may at element 518 access the program post-content file 124 and playback the program post-content at element 520, allowing the user to view the program post-content. Similarly to program pre-content, playback of the program post-content file may be controlled similarly to recorded programs, allowing the user to pause, stop, fast forward, rewind, etc. After playback completes, the method of flow chart 500 continues to element 522 for optional deletion of files. If the user does not desire to watch the program post-content (or if it was not recorded), the method of flow chart 500 continues to element 522 with accessing and playing the post-content file.

After playback or skipping of program pre-content files 122 and program post-content files 124, the extended program content module 318 may, at optional element 522, delete or archive the extended program content files, after which the method terminates. The extended program content module 318 may delete the program pre-content files 122 and program post-content files 124 (via the DVR storage interface 312) upon user request, after a user viewed the files, after a user has chosen not to view a file, when the user requests to delete the associated program file 120, or via other methodology.

It will be apparent to those skilled in the art having the benefit of this disclosure that the present invention contemplates methods, systems, and media for managing extended content for digital programs by a digital video recording device. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing extended digital program content, the method comprising the steps of:
　receiving by a digital video recorder a list of programs from a content provider, wherein each program from the list of programs is scheduled to broadcast between a defined start time and a defined end time;
　receiving by the digital video recorder a request from a user to record a scheduled program from the list of programs;
　subsequent to the step of receiving the request, determining by the digital video recorder to record extended program content in addition to the scheduled program;
　responsive to the step of determining to record the extended program content, determining by the digital video recorder a duration of the extended program content based on a type of the scheduled program, the defined start time of the scheduled program, the defined end time of the scheduled program, and content provider preferences;
　recording by the digital video recorder the scheduled program; and
　recording by the digital video recorder the extended program content for the determined duration of the extended program content.

2. The method of claim 1, further comprising the steps of:
　displaying by the digital video recorder an indication that the extended program content is available;
　receiving by the digital video recorder an indication that the user desires to view the extended program content; and
　playing by the digital video recorder at least part of the extended program content.

3. The method of claim 1, wherein the step of determining the duration of the extended program content comprises determining the duration of the extended program content further based on available storage space, a specified file size, user preferences, and digital video recorder provider preferences.

4. The method of claim 1, wherein the extended program content consists of content broadcast between a specified time prior to the defined start time and the defined start time.

5. The method of claim 1, wherein the extended program content consists of content broadcast between the defined end time and a specified time subsequent to the defined end time.

6. The method of claim 2, further comprising the step of:
　receiving by the digital video recorder a request to play the scheduled program;
　wherein the step of displaying by the digital video recorder the indication that the extended program content is available is performed in response to the step of receiving the request to play the scheduled program; and
　wherein the indication indicates that content, broadcast between a specified time prior to the defined start time of the scheduled program and the defined start time, is available.

7. The method of claim 2, further comprising the step of:
　playing by the digital video recorder the recorded scheduled program;
　wherein the step of displaying by the digital video recorder the indication that the extended program content is available is performed in response to the step of playing the recorded scheduled program; and
　wherein the indication indicates that content, broadcast between the defined end time of the scheduled program and a specified time subsequent to the defined end time, is available.

8. The method of claim 1, further comprising the steps of:
　displaying, by the digital video recorder, an indication that the extended program content is available; and
　subsequent to the displaying, deleting by the digital video recorder the extended program content responsive to a user choosing not to view the extended program content.

9. The method of claim 1, further comprising the steps of:
　displaying, by the digital video recorder, an indication that the extended program content is available; and
　subsequent to the displaying, archiving by the digital video recorder the extended program content responsive to a user choosing not to view the extended program content.

10. A computer-readable storage device having instructions stored thereon, the instructions for execution by at least one processor of a digital video recorder to implement a method, the method comprising the steps of:
　receiving by the digital video recorder a list of programs from a content provider, wherein each program from the list of programs is scheduled to broadcast between a defined start time and a defined end time;
　receiving by the digital video recorder a request from a user to record a scheduled program from the list of programs;
　subsequent to the step of receiving the request, determining by the digital video recorder to record extended program content in addition to the scheduled program;
　responsive to the step of determining to record the extended program content, determining by the digital video recorder a duration of the extended program content based on a type of the scheduled program, the defined start time of the scheduled program, the defined end time of the scheduled program, and content provider preferences;
　recording by the digital video recorder the scheduled program; and
　recording by the digital video recorder the extended program content for the determined duration of the extended program content.

11. The computer-readable storage device of claim 10, wherein the method further comprises the steps of:
　displaying, by the digital video recorder, an indication that the extended program content is available;
　receiving, by the digital video recorder, an indication that the user desires to view the extended program content; and
　playing, by the digital video recorder, at least part of the extended program content.

12. The computer-readable storage device of claim 10, wherein the step of determining the duration of the extended program content comprises determining the duration of the extended program content further based on available storage space, a specified file size, user preferences, and digital video recorder provider preferences.

13. The computer-readable storage device of claim 10, wherein the extended program content consists of content broadcast between a specified time prior to the defined start time and the defined start time.

14. The computer-readable storage device of claim 10, wherein the extended program content consists of content broadcast between the defined end time and a specified time subsequent to the defined end time.

15. The computer-readable storage device of claim 11, wherein the method further comprises the step of:
  playing by the digital video recorder the recorded scheduled program;
  wherein the step of displaying by the digital video recorder the indication that the extended program content is available is performed in response to the step of playing the recorded scheduled program; and
  wherein the indication indicates that content, broadcast between the defined end time of the scheduled program and a specified time subsequent to the defined end time, is available.

16. The computer-readable storage device of claim 11, wherein the method further comprises the step of:
  playing by the digital video recorder the recorded scheduled program;
  wherein the step of displaying by the digital video recorder the indication that the extended program content is available is performed in response to the step of playing the recorded scheduled program; and
  wherein the indication indicates that content, broadcast between the defined end time of the scheduled program and a specified time subsequent to the defined end time, is available.

17. The computer-readable storage device of claim 10, wherein the method further comprises:
  displaying, by the digital video recorder, an indication that the extended program content is available; and
  subsequent to the displaying, deleting by the digital video recorder the extended program content responsive to a user choosing not to view the extended program content.

18. The computer-readable storage device of claim 10, wherein the method further comprises:
  displaying, by the digital video recorder, an indication that the extended program content is available; and
  subsequent to the displaying, archiving by the digital video recorder the extended program content responsive to a user choosing not to view the extended program content.

19. A digital video recording system, the system comprising:
  one or more computer-readable storage devices;
  one or more processors;
  one or more computer-readable memories;
  program instructions, stored on at least one of the one or more computer-readable storage devices for execution by at least one of the one or more processors via at least one of the one or more memories, to receive inputs from a user;
  program instructions, stored on at least one of the one or more computer-readable storage devices for execution by at least one of the one or more processors via at least one of the one or more memories, to provide a list of programs to the user, wherein each program from the list of programs is scheduled to broadcast between a defined start time and a defined end time;
  program instructions, stored on at least one of the one or more computer-readable storage devices for execution by at least one of the one or more processors via at least one of the one or more memories, to receive a request to record a particular program from the user;
  program instructions, stored on at least one of the one or more computer-readable storage devices for execution by at least one of the one or more processors via at least one of the one or more memories, to record the particular program in response to receiving the request to record the particular program from the user; and
  program instructions, stored on at least one of the one or more computer-readable storage devices for execution by at least one of the one or more processors via at least one of the one or more memories, to determine to record extended program content associated with the particular program, responsive to the request to record the particular program;
  program instructions, stored on at least one of the one or more computer-readable storage devices for execution by at least one of the one or more processors via at least one of the one or more memories, to determine a duration of the extended program content based on a type of the particular program, the defined start time of the particular program, the defined end time of the particular program, and content service provider preferences; and
  program instructions, stored on at least one of the one or more computer-readable storage devices for execution by at least one of the one or more processors via at least one of the one or more memories, to record the extended program content for the determined duration of the extended program content.

20. The system of claim 19, wherein the program instructions to determine the duration of the extended program content further determine the duration of the extended program content based on available storage space, a specified file size, user preferences, and digital video recorder provider preferences.

* * * * *